No. 717,881. PATENTED JAN. 6, 1903.
G. W. MARBLE.
POWER TRANSLATING DEVICE.
APPLICATION FILED JULY 28, 1902.
NO MODEL. 4 SHEETS—SHEET 1.
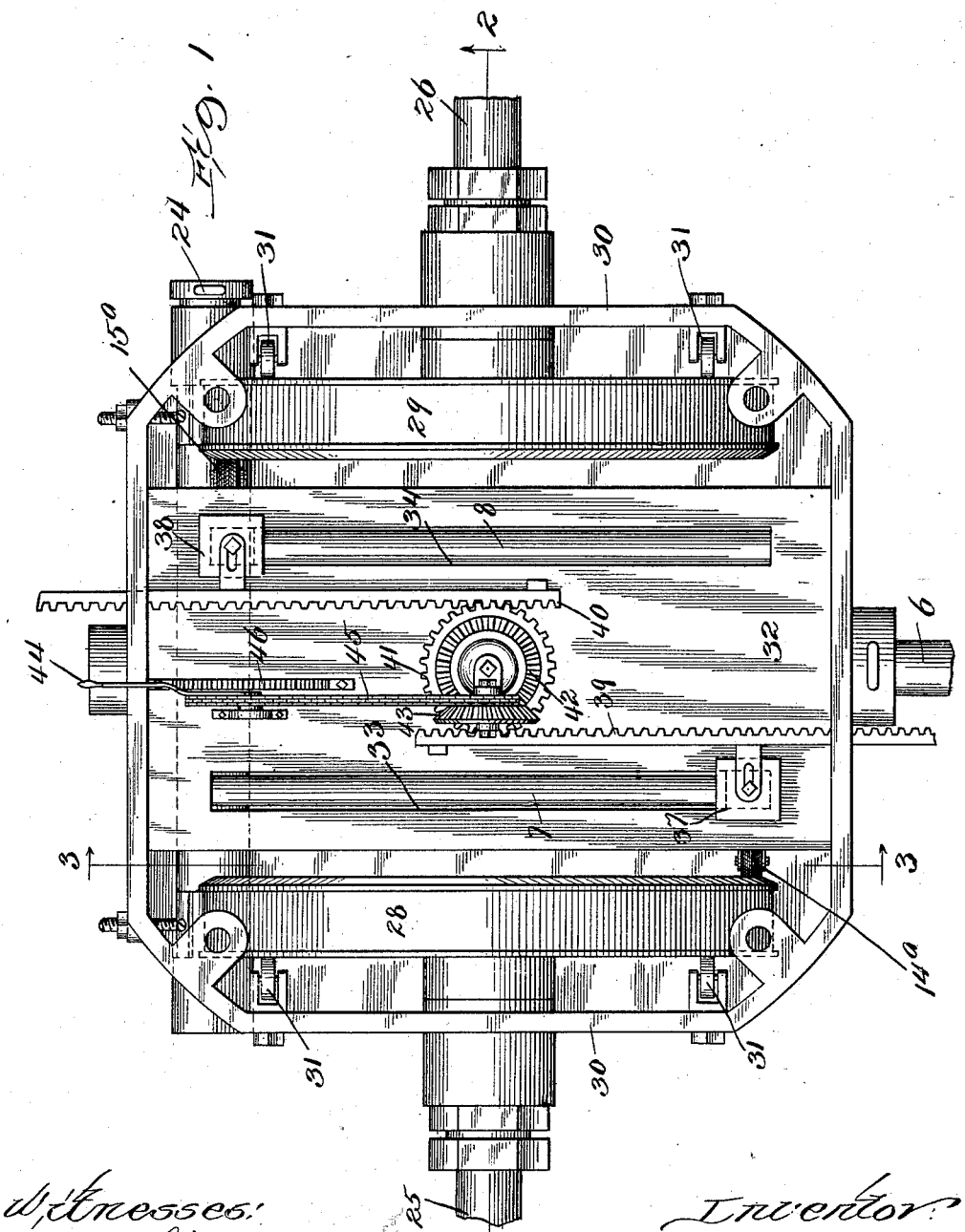

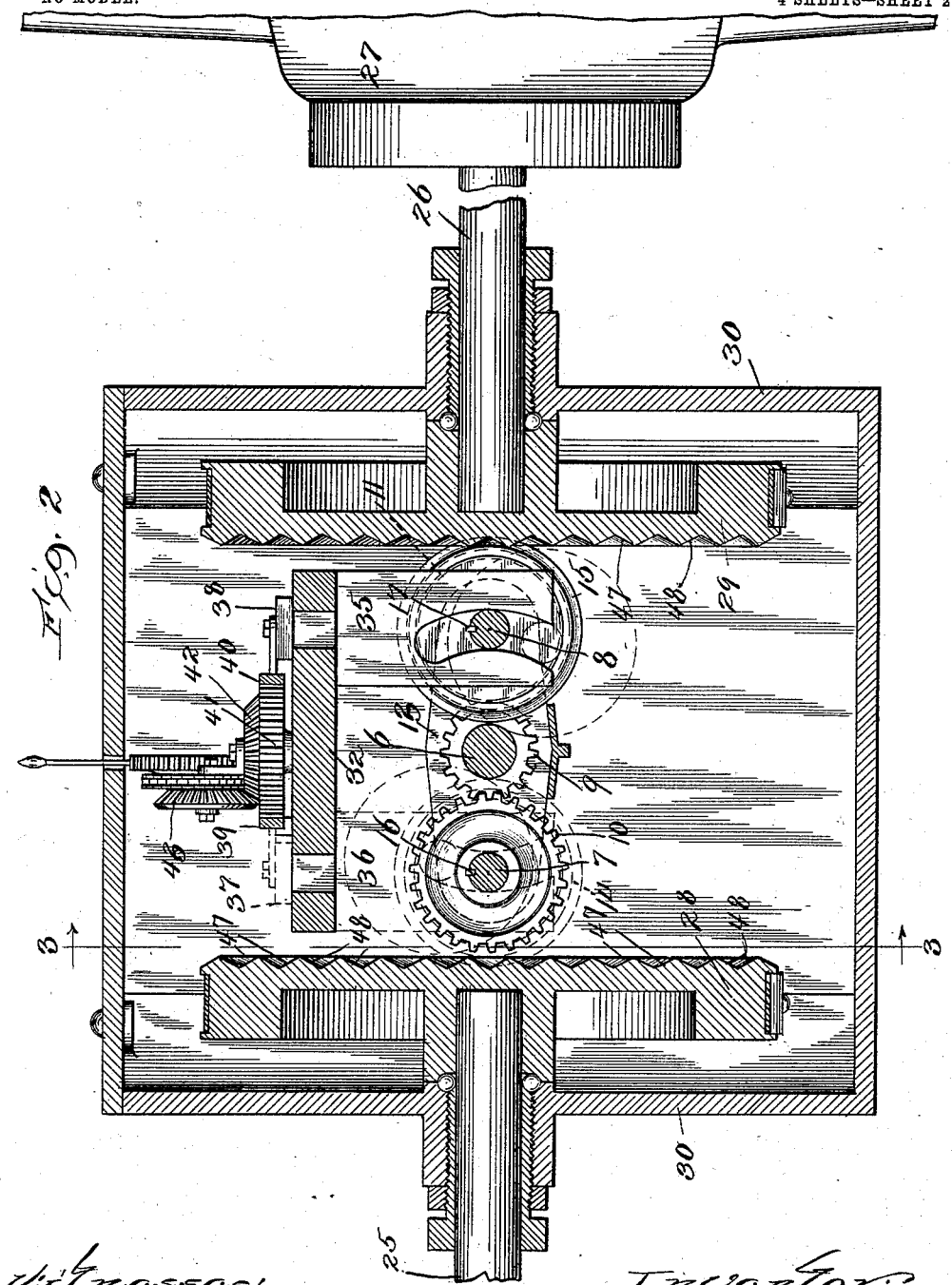

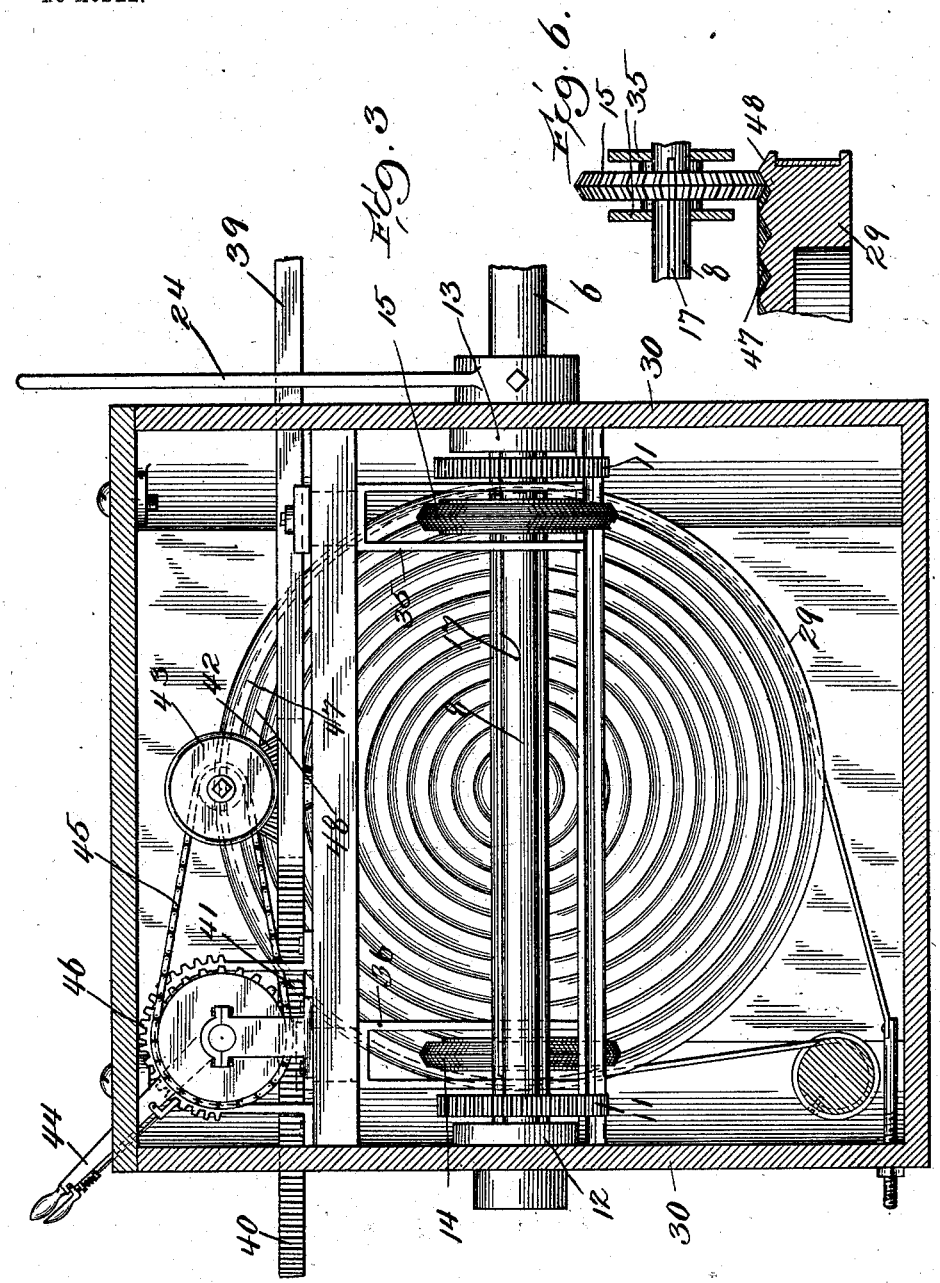

No. 717,881. PATENTED JAN. 6, 1903.
G. W. MARBLE.
POWER TRANSLATING DEVICE.
APPLICATION FILED JULY 28, 1902.
NO MODEL. 4 SHEETS—SHEET 4.
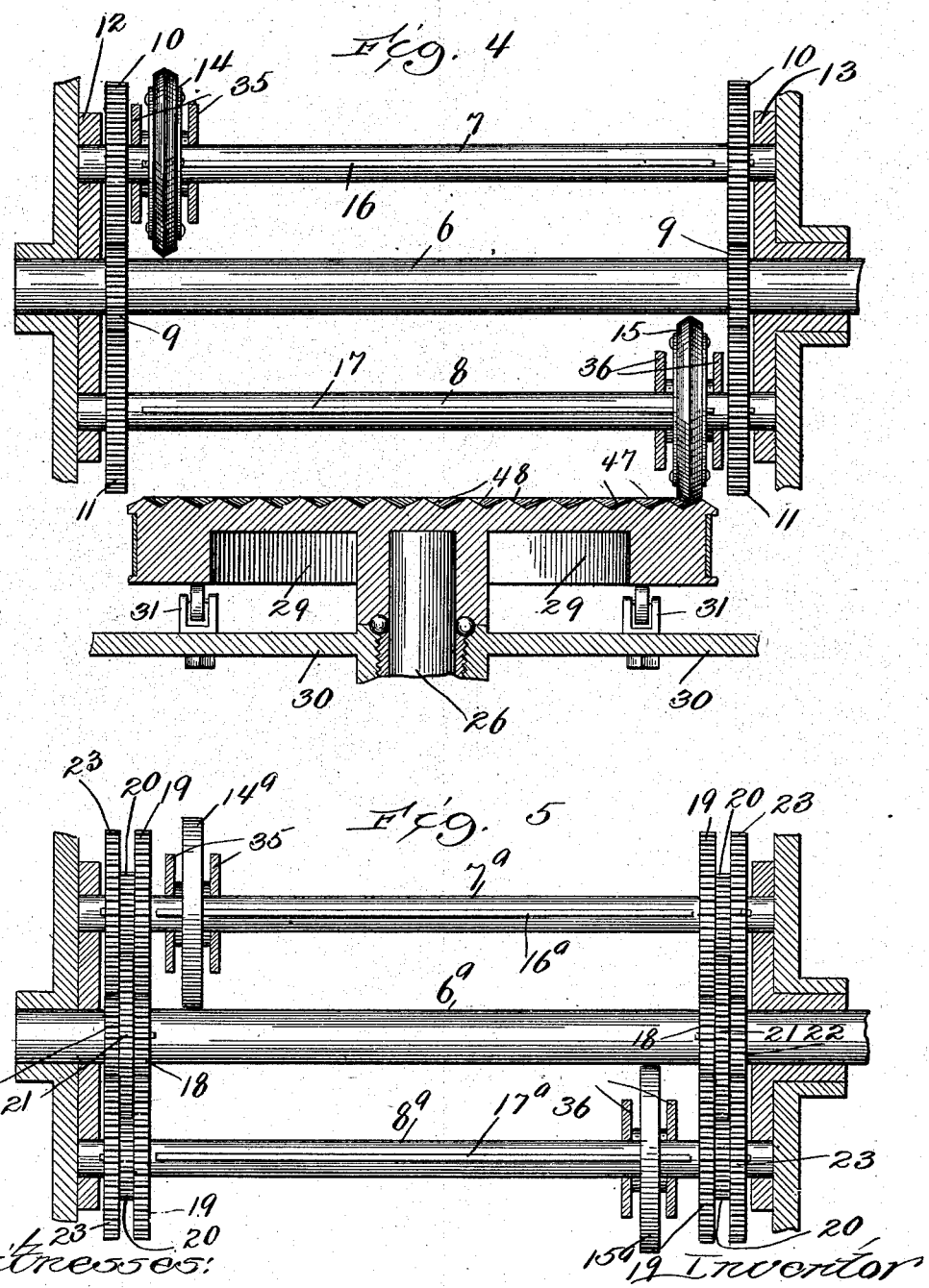

UNITED STATES PATENT OFFICE.

GEORGE W. MARBLE, OF BUCHANAN, MICHIGAN, ASSIGNOR, BY MESNE ASSIGNMENTS, TO THE MARBLE-SWIFT AUTOMOBILE COMPANY.

POWER-TRANSLATING DEVICE.

SPECIFICATION forming part of Letters Patent No. 717,881, dated January 6, 1903.

Application filed July 28, 1902. Serial No. 117,362. (No model.)

*To all whom it may concern:*

Be it known that I, GEORGE W. MARBLE, of Buchanan, in the county of Berrien and State of Michigan, have invented certain new and useful Improvements in Power-Translating Devices; and I hereby declare that the following is a full, clear, and exact description thereof, reference being had to the accompanying drawings, which form part of this specification.

My invention relates to improvements in power-translating devices.

The object of my invention is to provide a means whereby power from a motor moving at a constant or substantially constant velocity may be transmitted to suitable receptive mechanisms at velocities that are readily controllable.

A further object of my invention is to provide a means consisting of a power-translating device interposed between the prime mover and the driven mechanism whereby the direction of rotation and the changes in the velocity of the respective mechanisms may be effected in gradually increasing and decreasing gradations of small value.

The further object of my invention will become apparent from the following description.

An embodiment of my invention is exemplified in the accompanying drawings, in which—

Figure 1 is a plan view of the device. Fig. 2 is a central section taken on line 2 2 of Fig. 1. Fig. 3 is a section taken on line 3 3 of Figs. 1 and 2. Fig. 4 is an enlarged broken-away section of a detail, showing the rocking frame carrying the intermediate translating-disks and shafts upon which they are mounted. Fig. 5 is a similar view of a modification. Fig. 6 is a detail showing gear-teeth on the driving and driven disks.

In all of the views the same numerals of reference indicate similar parts.

My invention is especially adapted to be used in connection with the power-producing motor of an automobile for transmitting the power from such a constantly-operating motor to the driving traction-wheels of the automobile. It is also especially adapted to be used as a means for translating power of a prime moving shaft to a driven shaft when power is being transmitted to a lathe or such other instrument or machine where frequent changes in the velocity and direction of motion are necessary. There are many other uses to which my device may be applied that will be readily suggested to persons skilled in the art to which it appertains.

The prime mover is connected to the driving-shaft 6 by any convenient means. On either side of the driving-shaft or parallel with it are intermediate rotating shafts 7 and 8. These shafts are rotated by the main shaft through the instrumentality of a train of gearing composed of a pinion 9, fixed to the main shaft, and gear-wheels 10 and 11, fixed to each of the shafts 7 and 8, respectively. I have shown, in the drawings, this train of gearing fixed to each end of the shafts 7 and 8; but it is evident that a single train of gearing may be used. Rocker-arms 12 and 13 are mounted on the shaft 6 and are adapted to be oscillated on the axis of the shaft 6 and are properly secured together by any convenient means. They afford bearings for the rotatable shafts 7 and 8, thus providing a rocker-frame containing the shafts 7 and 8 and the respective intermediate transmitting-disks 14 and 15, which are adapted to be shifted longitudinally upon their respective shafts. The shafts 7 and 8 each carry a longitudinal spline 16 and 17, respectively, into which feathers fixed in the bore of the disks 14 and 15 are adapted to engage, whereby a positive rotary motion is imparted to the respective disks when the shafts 7 and 8 are rotated, permitting the disks 14 and 15 to be freely moved longitudinally upon the respective shafts 7 and 8. The friction-disks 14 and 15 are made of a material possessing a high friction coefficient and are made with conical peripheral surfaces, as shown, for a purpose to be hereinafter described. The surfaces of these disks may be provided with gear-teeth to engage similar teeth that may be carried by the conical annular surfaces of the driven disks. In the modification shown in Fig. 5 these disks are not so shaped, but have flat peripheral surfaces which possess the same frictional characteristics.

The modification shown in Fig. 5 illustrates a back gearing arranged as a means for further reducing the velocity of the shafts 7 and 8 with reference to the velocity of the main driving-shaft 6. The main shaft 6 has fixed to it a small pinion 18, which meshes into a gear 19 of larger diameter, the latter being fixed to a small pinion 20, both being adapted to be loosely revolved upon the shaft on which it is located. The pinion 20 meshes into a large gear 21, which is fixed to a small pinion 22, both being loose upon the main shaft 6, and finally the pinion 22 meshes into a gear 23, one of which is fixed upon each of the shafts 7 and 8, respectively. This is the ordinary form of back gearing and is a means by which the velocity of the shafts 7 and 8 may be materially reduced with reference to the main driving-shaft 6. The rocker-arm 13 is provided with a hub which contains a bearing for the main shaft 6 and extends beyond a perforated boss, through which this hub passes, having a lever 24 fixed thereto for the purpose of oscillating the rocker-frame consisting of the arms 12 13, the connecting means, and the shafts 7 and 8. The driving-shafts 25 and 26 are placed in the same axial line, and each of the said shafts may be connected to one of the traction-wheels of a motor-vehicle. A broken-away portion of such a wheel is represented by 27. (Shown in Fig. 2.) These shafts have fixed to their confronting ends driven disks 28 and 29. These disks occupy parallel planes.

A frame or casing 30 provides the proper bearings and supports for the various parts of the device and incloses the parts in a practically dust-proof housing.

31 31 are roller thrust-bearings arranged circumferentially around the outer edge of the disks 28 and 29 for supporting them when thrust or pressure is applied to the opposite surface of the said disks. Any convenient means may be employed for adjusting these thrust-bearings with reference to the surfaces of the disks upon which they are adapted to track and support.

A plate 32 is arranged inside of the casing 30 and is fixed to the opposite side walls upon which the mechanism for shifting the friction-disks 14 and 15 is mounted. This plate is provided with slots 33 and 34. Downwardly-depending segmentally-slotted forked arms 35 and 36 are adapted to be longitudinally shifted along the respective shafts 7 and 8. These arms inclose the respective intermediate friction-disks 14 and 15 and are the means by which the said disks are shifted longitudinally along their respective shafts. The upper ends of these arms pass through the slots 33 and 34 and are secured in place by means of cap-plates 37 and 38, respectively. Longitudinally-reciprocating racks 39 and 40 are respectively connected to the downwardly-depending arms 35 and 36. These racks are reciprocated by means of a gear-wheel 41, to which they are connected in mesh on opposite sides. The gear-wheel 41 is rotated by means of the oscillating movement of the lever 44 through the instrumentality of the chain 45 and the beveled gear-wheels 42 and 43. A segment-shaped metal support 46 is adapted to hold the lever 44 in a determined and definite position, so that the disks 14 and 15 may be reciprocated along their respective shafts a distance corresponding relatively to the distance between the notches in the support 46. It will be noticed that the disks 28 and 29 are each provided with a series of concentrically-arranged tapered surfaces 47 and 48. These may be either friction-surfaces or they may be provided with gear-teeth, as shown, the surfaces 47 being tapered in one direction and the surfaces 48 in another direction.

When the peripheral friction-surface on one disk when both disks are flat, as shown in Fig. 5, is brought into driving contact with the side surface of another disk and an effort is made to drive one of the contacting disks by the rotation of the associated disk, the grinding effect, due to slip of surfaces between the disks, will be proportional to the length of radius covered by the periphery of the contacting disk resulting from the difference in velocity of the portion of the disk covered along its radius. To avoid this difficulty to some extent, I have provided a series of concentric tapered surfaces 47 and 48 and have tapered the peripheral surface of the driving-disks 14 and 15 upon opposite sides of a diametral plane through their centers, so that when these disks are shifted to opposite diameters of the driven disks 28 and 29 the opposite tapered surfaces of the disks 14 and 15 will be brought into contact with the driving-surfaces of the disks 28 and 29 upon the opposite diameters of the driven disks, and by arranging a means for shifting the disks 14 and 15 a definite distance and securing the mechanism in its shifted position, as shown by the levers 44 and the securing means 46, the disks 14 and 15 may be thereby shifted and held in contact with each or any of the series of annular concentric tapered friction-surfaces carried by the disks 28 and 29.

The use and operation of my invention are as follows: When the device is applied to an automobile, the traction-wheels 27 are secured to the shafts 25 and 26, as shown in Fig. 2. The driving-shaft 6 may be rotated by a motor producing a constant or not necessarily alterable velocity—such, for instance, as a gasolene-engine. When the oscillating frame, containing the intermediate shafts 7 and 8 and the respective friction-disks, is in a position shown in dotted lines in Fig. 2, the intermediate friction-disks do not make contact with the respective driven disks which are connected to the shafts 25 and 26. At this time the power is not being transmitted to the traction-wheels of the vehicle and the shafts 7 and 8 are turned idly by the driving-shaft 6 through the train of gearing connecting the respective shafts.

When the handle 24 (shown in Fig. 3) is moved in a direction to oscillate the frame containing the intermediate friction-disks, these disks are thereby brought into driving contact with the face of the respective driven disks 28 and 29 in a manner shown in Fig. 4.

On account of the laterally-tapered form or shape of the face of the driven disks and the conical shape of the peripheries of the intermediate driving-disks the relative velocity of the contacting parts is uniform, and for this reason the highest efficiency is attained in a friction-drive.

It will be noticed that the depending forked arms 35 and 36 are slotted so as to permit the oscillation of the shafts 7 and 8.

When the disks 14 and 15 are brought into frictional contact with the respective disks 28 and 29, power is transmitted from shaft 6 to the shafts 25 and 26. The speed at which the shafts 25 and 26 will be driven under a given condition will be dependent upon the positions at which the intermediate driving-disks 14 and 15 make contact with the respective driven disks 28 and 29 with reference to the radius of the latter. In Fig. 4 when the driving-disks 15 make contact near the outer periphery of the face of the driven disk 29 the shaft 26 will be rotated at its lowest speed with reference to the speed of the driven shaft 6 but in this position the translating mechanism will effect a greater torque or turning effect than when the disks 14 and 15 are located along the radius of the disks 28 and 29 at points near the center thereof. The operation of longitudinally-moving disks 14 and 15 along their respective shafts to positions on the radii of the respective driven disks is accomplished by first oscillating the frame carrying the intermediate mechanism, consisting of the shafts 7 and 8 and the disks 14 and 15, so as to bring the said disks out of contact with the driven disks 28 and 29. At this time the lever 44 is moved so that the locking mechanism thereof will engage one of the notches carried in the support 46. By this means the disks 14 and 15 are moved along their respective shafts a definite distance, and the peripheral surfaces thereof will always contact with one of any of the desired surfaces 47 and 48 of the disks 28 and 29. By this means the speed relation and direction of rotation of the shafts 25 and 26 with reference to the driving-shaft may be varied to any desired degree within the compass of the power-producing motor.

When desired, the modification shown in Fig. 5 with reference to the disks 14ª and 15ª may be employed instead of the construction shown in Fig. 4. In this event the surfaces of the respective disks 28 and 29 are a plane and not corrugated, and in this event also it does not become necessary to move the disks 14ª and 15ª a definite distance with reference to the contacting disks 28 and 29, and therefore any convenient means for coincidently shifting the disks 14ª and 15ª may be employed instead of a substantial equivalent of that shown in Figs. 2 and 3.

It will be observed that any relative velocity of the driven shafts 25 and 26 in either direction of rotation with respect to the driving-shaft 6 may be established and maintained and that the apparatus is exceedingly simple, powerful, and highly efficient.

Having described my invention, what I claim as new and useful, and desire to secure by Letters Patent of the United States, is—

1. The combination with confronting driven disks, and a driving-shaft, of intermediate disks, each capable of rotative engagement with one of the driven disks, a train of gearing connecting the driving-shaft and each of the intermediate disks, and a means for effecting rotative engagement of the respective driven and intermediate disks.

2. The combination with confronting driven disks and a driving-shaft, of intermediate disks, each capable of rotative engagement with one of the driven disks, a frame mounted on the driving-shaft, rotatable shafts carried by said frame upon each of which one of said intermediate disks is mounted, a train of gearing connecting the driving-shaft and each of the shafts upon which the said intermediate disks are mounted, and a means for moving said frame for effecting rotative engagement of the respective driven and intermediate disks.

3. The combination with an axially-stationary driven disk, provided on its face with three or more laterally-extending, inclined surfaces, a driving-disk having an inclined periphery adapted for operative engagement with said inclined faces of the driven disk, and capable of bodily movement in two directions, means for moving said driving-disk laterally into and out of engagement with the driven disk, and means for moving said driving-disk axially while out of engagement with the driven disk.

4. The combination of a driving-disk, having an obliquely-tapered periphery, a shaft upon which said disk is mounted in rotatively-fixed and axially-slidable relation, a driven disk provided with three or more laterally-extended, conically-tapered, concentric surfaces, means for sliding the driving-disk upon its shaft, and means for moving said shaft toward and from the driven disk, whereby said driving-disk may be brought into operative engagement with any one of the concentric surfaces of the driven disk.

5. The combination with confronting driven disks and a driving-shaft, of intermediate disks each capable of rotative engagement with one of the driven disks, a series of annular, laterally-projecting surfaces carrying gear-teeth on the face of each of the driven disks, gear-teeth on the peripheral surfaces of the intermediate disks, tapered and arranged to coact with and engage the gear-teeth on the faces of the respective driven disks, and a means for effecting engagement of the respective disks.

6. The combination of a driving-shaft, confronting driven disks provided upon their faces with a series of laterally-extending, conically-tapered, concentric surfaces, intermediate driving-disks, rotated by said shaft, having obliquely-tapered peripheries, adapted to engage the surfaces on the driven disks, a means for coincidently moving said intermediate driving-disks across the faces of the respective driven disks to predetermined points, and a means for effecting engagement of the respective disks.

In testimony that I claim the foregoing as my own I affix my signature in presence of two witnesses.

GEORGE W. MARBLE.

Witnesses:
ALISON C. ROE,
S. ROE.